US006669008B2

(12) United States Patent
Giovanardi

(10) Patent No.: US 6,669,008 B2
(45) Date of Patent: Dec. 30, 2003

(54) PROCESS AND APPARATUS FOR LOADING DIES FOR FORMING CERAMIC TILES

(75) Inventor: Umberto Giovanardi, Castellarano (IT)

(73) Assignee: R.P. S.r.l., Roteglia (Reggio Emilia) (IT)

( * ) Notice: Subject to any disclaimer, the term of this patent is extended or adjusted under 35 U.S.C. 154(b) by 161 days.

(21) Appl. No.: 09/911,827

(22) Filed: Jul. 25, 2001

(65) Prior Publication Data

US 2002/0014713 A1 Feb. 7, 2002

(30) Foreign Application Priority Data

Jul. 25, 2000 (EP) .......................................... 00830525

(51) Int. Cl.[7] .............................................. B65G 15/60
(52) U.S. Cl. ...................................... 198/812; 198/588
(58) Field of Search ................................ 198/588, 812

(56) References Cited

U.S. PATENT DOCUMENTS 3,324,987 A * 6/1967 Kiesser .................... 198/812 X
3,556,280 A * 1/1971 Schnee et al. .......... 198/812 X
4,151,906 A * 5/1979 Pfeiffer et al. .......... 198/812 X
5,088,592 A * 2/1992 Palmers .................. 198/812 X
5,322,154 A * 6/1994 Lenherr .................. 198/812 X

FOREIGN PATENT DOCUMENTS

DE 31 51 654 A1 7/1982
WO WO 98/23424 A2 6/1998

OTHER PUBLICATIONS

Patent Abstracts of Japan, vol. 017, No. 449 (M–1465), Aug. 18, 1993.

* cited by examiner

*Primary Examiner*—James R. Bidwell
(74) *Attorney, Agent, or Firm*—Browdy and Neimark, P.L.L.C.

(57) ABSTRACT

In an apparatus, a layer of powders bearing patterns is laid on a rest surface of a belt conveyor, the conveyor belt is introduced between the bottom die and the top die above a cell afforded in the bottom die, the layer of powders is unloaded into the cell by a swift withdrawal of the belt conveyor. The withdrawal of the unloading end of the conveyor belt is carried out with no relative dragging between the rest surface and the bottom of the layer of powders, by a movement which is parallel to the rest surface and which is very rapid.

6 Claims, 4 Drawing Sheets

PROCESS AND APPARATUS FOR LOADING DIES FOR FORMING CERAMIC TILES

BACKGROUND OF THE INVENTION

Specifically, though not exclusively, the invention is particularly applicable in the field of loading devices structured for arranging internally of the forming cells of the die, and generally above a previously-laid layer (constituted by larger-grain support material), a further layer of powder material, generally finer and of better quality, which is destined to form the decorated surface of the tile which will be in view.

Devices of this type are known, generally referred-to as double-loading devices, and combine with a usual press-loading tray or truck various devices, among which small conveyor belts which, working in synchrony with the tray or truck, carry out the above-mentioned double-loading operation by depositing a further layer of powder in the cell, previously-filled from the tray.

The main limitation in the prior art consists in the considerable deformation which the decoration (in powder-form) is subject to when it is dropped from the end of the conveyor belt during the latter's horizontal passing movement over the forming cell.

In effect this passing movement creates a sort of "waterfall" effect, causing an undesired remixing of the powders which is further accentuated by the impact of the falling powders (the second load) on the underlying powders already deposited on the bottom of the cell from the first loading operation. The desired kinematic solution should be that the displacement speed (retreat) of the conveyor belt is equal and opposite to the transport speed of the belt on which the powders are deposited. This condition, however, is increasingly more difficult to maintain as the speeds increase.

A further drawback in the prior art is that the unloading times are quite considerable and add to work-cycle times.

The main aim of the present invention is to obviate the above drawbacks in the prior art by providing a process for depositing the powders which does not alter in any significant way the structure of the layer that is deposited.

An advantage of the invention consists in its being applicable to any existing type of ceramic press.

A further advantage of the invention is that it enables a true and proper decoration line to be set up, directly applied on the upper branch of the conveyor belt and composed of a plurality of decorator devices which can therefore produce different decorations. The number of possible decorations, however, does not in any way influence the work cycle time.

These aims and advantages and more besides are all attained by the present invention, as it is characterised in the appended claims.

SUMMARY OF THE INVENTION

The invention relates to a process for loading dies for forming ceramic tiles, of a type where a layer of powders bearing a decoration is laid on a rest surface of a conveyor belt, the conveyor belt is introduced between a bottom die and a top die above a cell afforded in the bottom die, and the layer of powders is dropped into the cell as the conveyor belt is retreated; characterised in that at least a retraction of the unloading end of the belt conveyor occurs without any relative dragging between the rest surface and a bottom of the layer by means of a translation of the unloading end, which is parallel to the rest surface and which retraction is characterised by being very rapidly executed.

BRIEF DESCRIPTION OF THE DRAWINGS

Further characteristics and advantages of the present invention will better emerge from the detailed description that follows of a preferred but nonexclusive embodiment of the invention, illustrated purely by way of a non-limiting example in the accompanying figure, in which.

DESCRIPTION OF THE PREFERRED EMBODIMENTS

Figure 1:
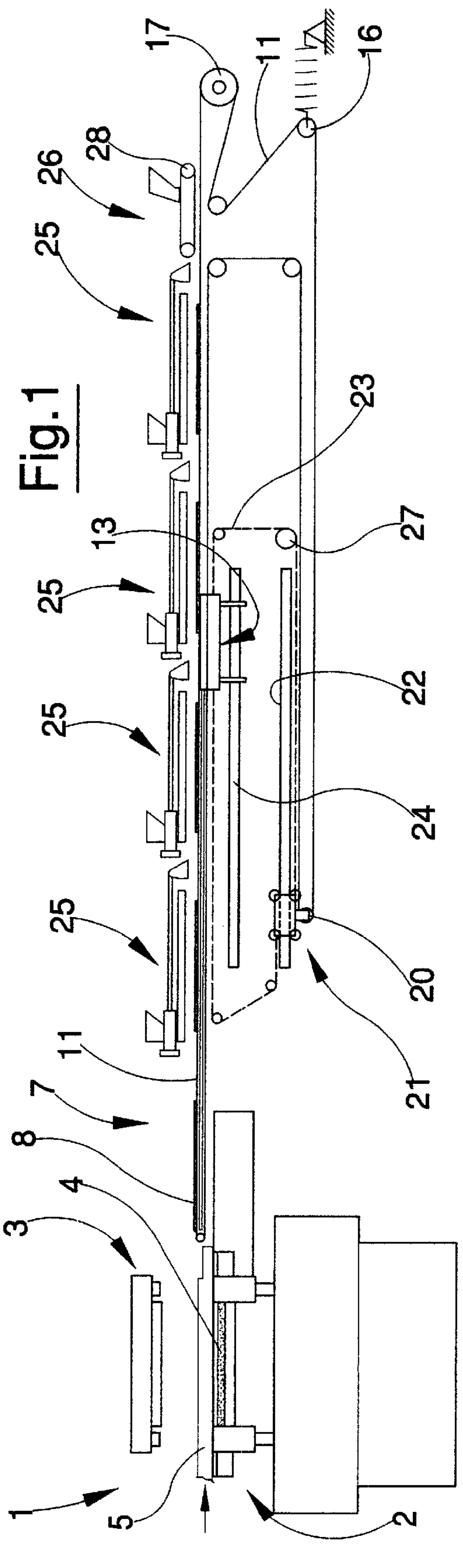
FIG. 1 is a schematic side view in vertical elevation.

With reference to the figures, 1 schematically denotes a press for forming ceramic tiles, with a bottom die 2, affording a cell 4 destined to receive the powders to be pressed, and a top die 3.

A usual tray 5 is positioned in a raised position between the bottom die 2 and the top die 3, which tray 5 has the task of depositing a first layer of powder material in the cell 4; this powder will function as a "support" for a second layer, generally composed of better-quality and finer material and laid in a thinner layer, which will form the final in-view decorated surface of the tile. The second layer is loaded into the cell 4 on top of the bottom layer, previously loaded by the tray 5, by the device of the invention, specially made for effecting this second loading operation.

The process for effecting this second loading operation involves creating a layer of powders 8 having decorations on the rest surface of a belt conveyor 7, the introduction of the belt conveyor 7 between the bottom die 2 and the top die 3 above the cell 4 afforded in the bottom die 2, followed by the unloading of this layer 8 into the cell 4 contemporaneously with the retreat of the belt conveyor 7. The invention is distinguished from the prior art by the fact that at least the retreat of the unloading end of the belt conveyor 7 occurs, with no relative dragging between the rest surface and the base of the layer 8, through a translation of the unloading end which is parallel to the rest surface and which is characterised by a high-speed execution, so as to remove the rest surface from beneath the layer 8 of powders very swiftly, causing the powders to fall vertically with no friction against the unloading end. In effect, the unloading end retreats so quickly that the powders forming the layer 8, having their support removed from beneath them, fall freely and vertically.

Figure 3:
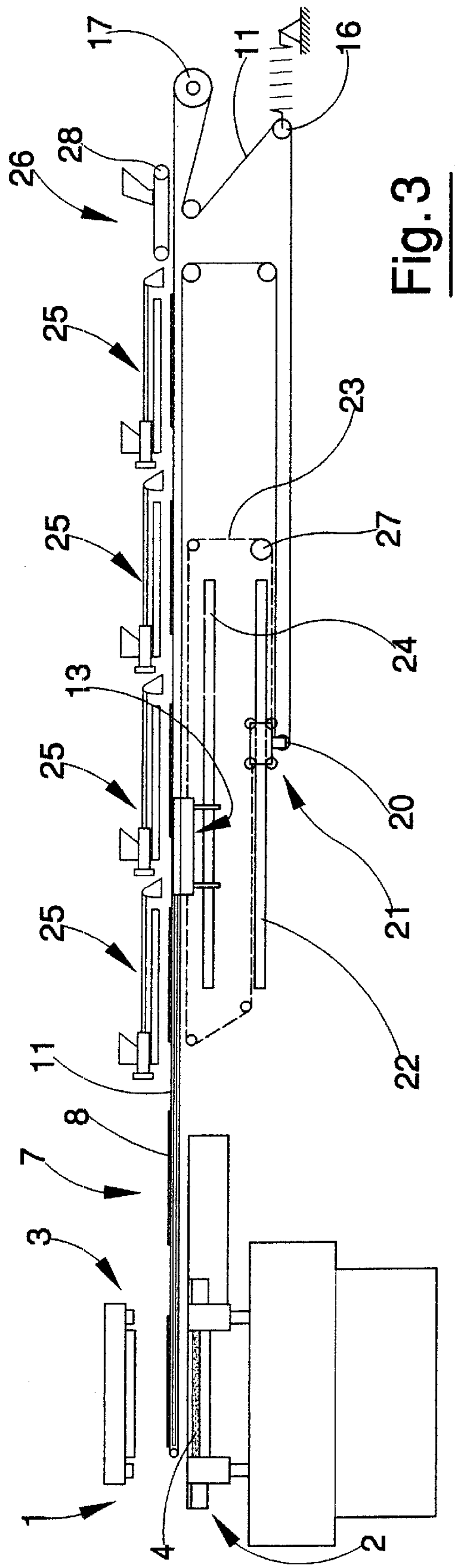
FIGS. 2, 3 and 4 are the same view as FIG. 1 in three different operating configurations.

During the unloading stage, evidenced in FIG. 3, the drawing device 17 remains inactive while the slide 13, and with it the unloading end of the belt conveyor 7, are retreated very quickly by the drawing pulley 27 which pulls the conveyor belt 23. It is at this stage that the various decorations at the various decorating stations are unloaded from the dry decoration dispensers 25.

The perfect adherence of the belt 11 to the head 12 is ensured by a stretcher 16 pulling constantly in the direction indicated by the arrow.

The layer 8 is composed of a bottom part 9 on which a top decorative layer 10 is deposited, comprising powders arranged according to predetermined patterns.

With the process of the invention, the layer of powders is dropped in such a way that the structure of the layers deposited is not changed, especially the part thereof which forms the pattern of the decoration.

The various points of the layer 8 have parallel and uniform drop trajectories which enable the structure of the decorations present on the top decorative layer 10 to remain unaltered. Further, the bottom part 9 functions somewhat as a buffer, softening the impact with the first layer of material already present on the bottom of the cell 4 and preventing a further re-mixing of the powders in the top decorative layer 10.

The above-described process is carried out by an apparatus for loading dies for ceramic tile-forming, which comprises at least one belt conveyor 7, a terminal part of which, known as the unloading end, at which the belt 11 of the belt conveyor 7 winds about a head 12, and returning at an angle of about 180°, is constrained to a slide 13 which can be commanded to translate in two senses along a guide 24 in a parallel direction to the rest surface of the belt conveyor 7.

The belt 11 is ring-wound and has an upper branch 14 on which the powders rest and a lower branch 15, parallel to the upper branch 14; the belt 11 is also associated to a stretcher 16 which keeps the belt 11 in constant tension.

A drawing device 17 is also associated to the belt 11 and on command controls the motion of the upper branch 14 of the belt 11.

Figure 5:
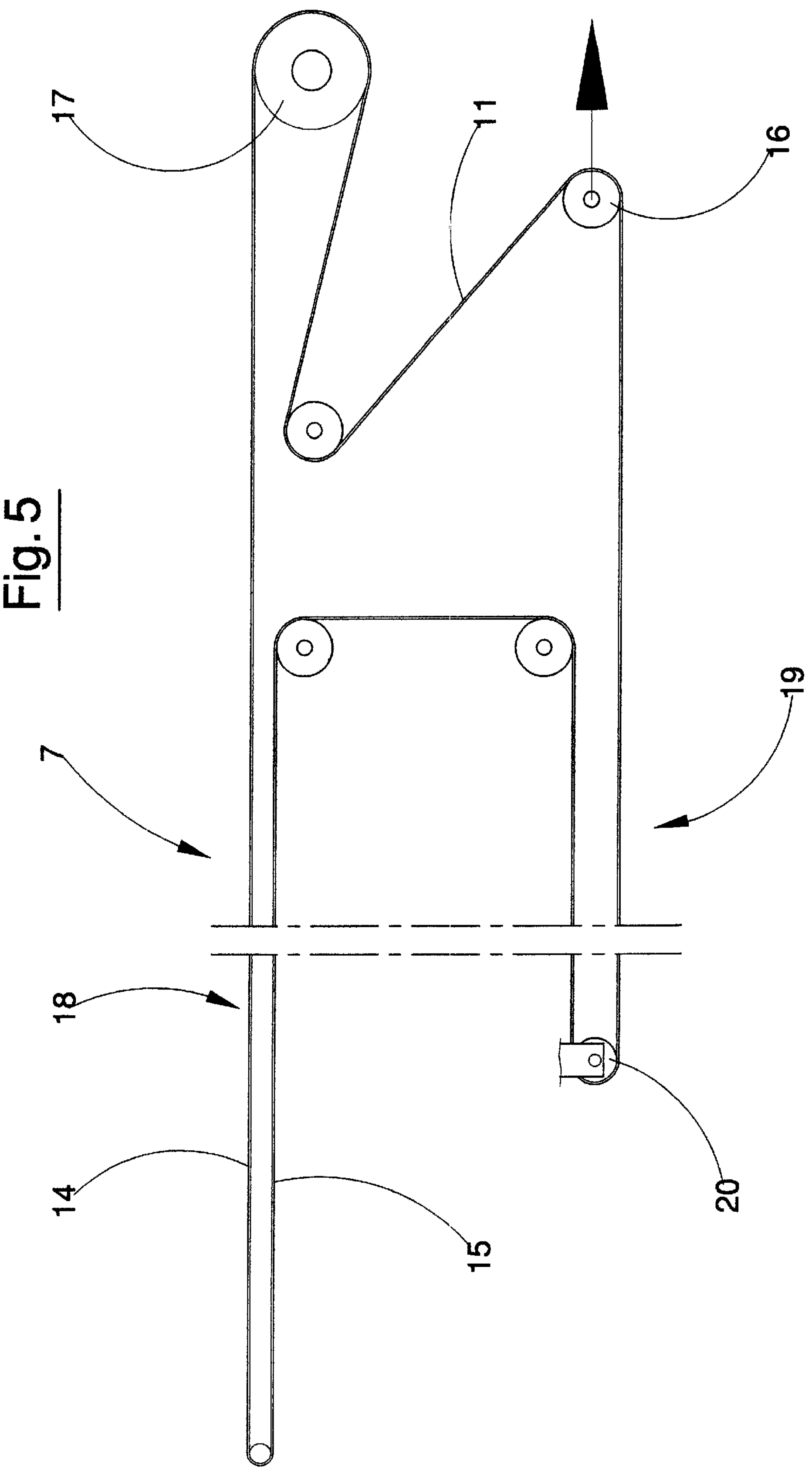
FIG. 5 is a schematic view of the detail of the belt removed from the rest of the apparatus.

The belt 11 is wound on a series of snub pulleys which effectively give rise to a doubled upper branch, denoted by 18 in FIG. 5, parallel and moving in the same direction as the upper branch 14, and a doubled lower return branch 19 which is parallel to the doubled upper branch 18 and is generated by the 180° return of the belt about a head pulley 20.

The head pulley 20 is mounted idle on a cursor 21 which is guided to slide freely along a guide 22 in a parallel direction to the slide 13 movement direction.

The cursor 21 and the slide 13 are reciprocally constrained to displace to the same degree, in the same direction, but in opposite senses. A drawing pulley 27 is associated to the cursor 21 and the slide 13 and on command causes both to slide.

The cursor 21 and the slide 13 are indeed reciprocally connected by a belt 23 ring-wound about a system of fixed pulleys.

The illustrated apparatus enables the unloading end of the belt conveyor 7 to be introduced and retreated into and out of the space comprised between the bottom die 2 and the top die 3.

Furthermore, the possibility of keeping the upper branch 14 of the belt 11 still during the retreat phase, and of moving the belt 11 and the unloading end during the introduction step, as well as the special configuration of the belt conveyor 7, enable the problem-free setting-up of a true and proper decorating line, containing several dry-decoration dispensers 25, which are therefore able to produce various decorations directly using the upper branch 14 of the belt conveyor 7. During the introduction step of the process, shown in FIG. 2, the machine 26 applying the bottom of the powders destined to constitute the part of the bottom part 9 of the layer 8 is brought into action; this machine is located upstream of the dry-decoration dispensers 25, so that the bottom part 9 can be deposited first.

Figure 2:
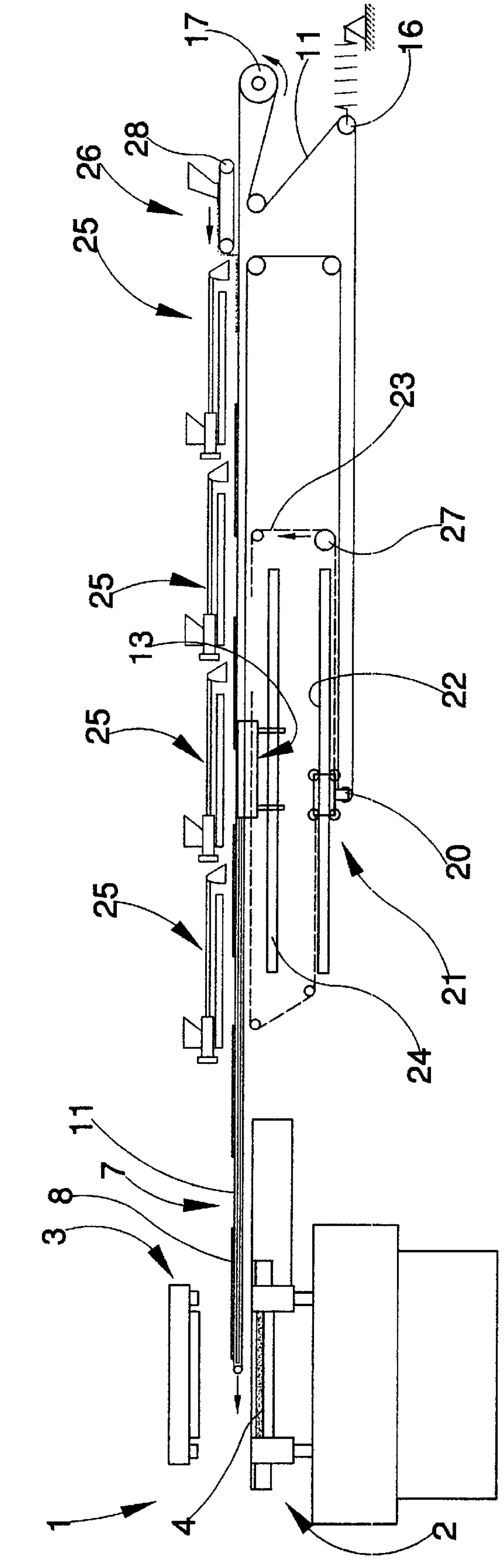
Figure 4:
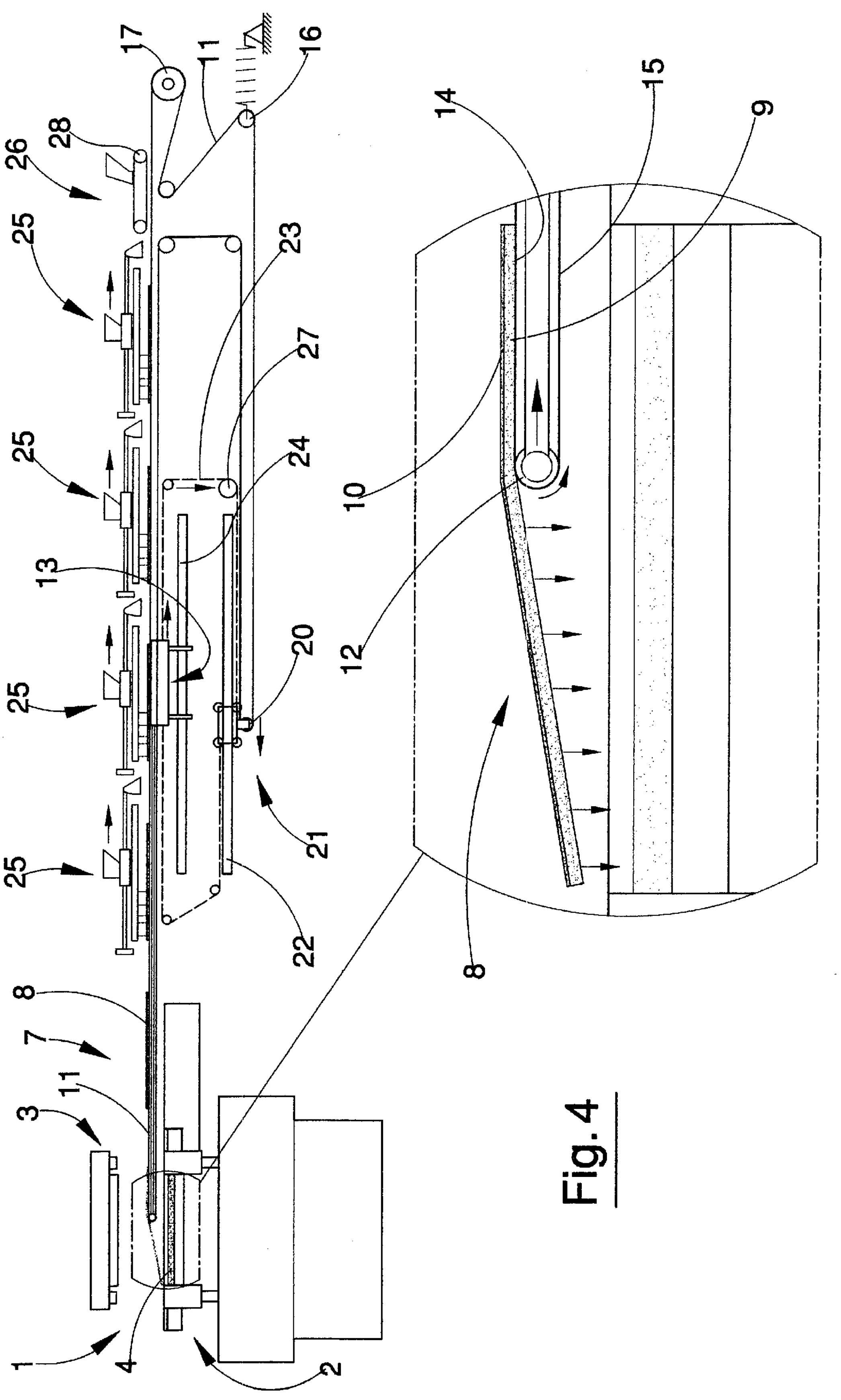

During the introduction step, illustrated in FIG. 2, the drawing pulley 27 is activated to advance the slide 13, with a consequent retreat of the cursor 21. The drawing device 17 draws the belt 11 so that the upper branch 14 advances at the same speed and in synchrony with the unloading end of the belt conveyor 7, and the pulley 28 drawing the small belt of the machine 26 for applying the bottom draws the small belt in synchrony with the belt ii so that it can deposit the bottom part 9 off the layer 8.

What is claimed:

1. An apparatus for loading dies for ceramic tile forming, comprising:

- a first endless conveyor belt having an unloading end which winds about a head;
- a first drawing device engaged to move the first endless conveyor belt on command;
- a stretcher which keeps the first endless conveyor belt in a state of tension;
- a second endless conveyor belt engaged to the head of first endless conveyor belt;
- a second drawing device engaged to the second endless conveyor belt to move the head back and forth in a direction parallel to a rest surface on the first endless conveyor belt.

2. The apparatus according to claim 1, wherein the first endless conveyor belt has an upper branch on which the rest surface and the head are located and a lower branch winds around a head pulley.

3. The apparatus according to claim 2, wherein the head is engaged to a slide fixed on the second endless conveyor belt, the slide being slidable on a first guide, the head pulley is engaged to a cursor fixed on the second endless conveyor belt, the cursor being slidable on a second guide, wherein a longitudinal length of the first guide and the second guide are parallel to the rest surface on the first endless conveyor belt.

4. The apparatus according to claim 2, wherein the second endless conveyor belt is engaged to and within the upper branch and the lower branch of the first endless conveyor belt.

5. The apparatus according to claim 2, wherein the first endless conveyor belt winds about the head and turns in an angle of about 180° to form the upper branch and around the head pulley in an angle of about 180° to form the lower branch.

6. An apparatus according to claim 3, wherein the cursor and the slide are reciprocally constrained to make displacements of a same distance, in a same direction but in opposite senses.

* * * * *